Nov. 10, 1931.  J. W. NUNAMAKER  1,831,777
HAND COIL SPRING MAKING TOOL
Filed Aug. 24, 1929   2 Sheets-Sheet 1
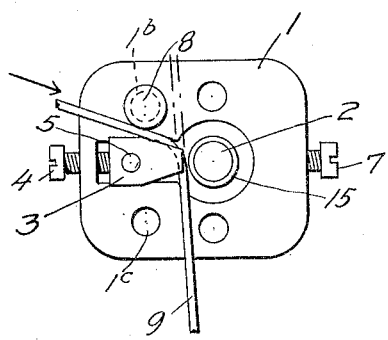
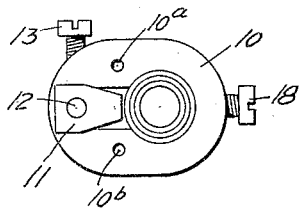
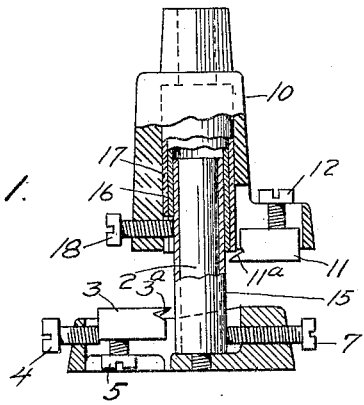
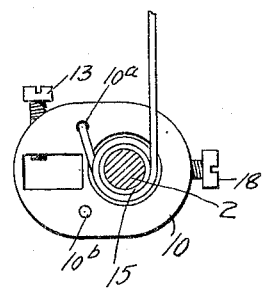
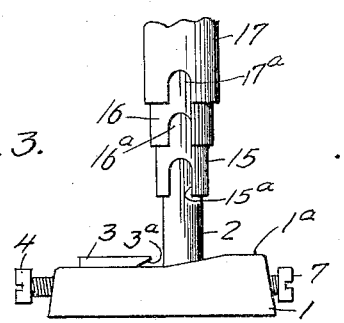
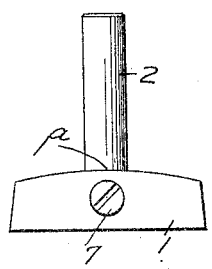
INVENTOR:
John W. Nunamaker
BY
O. Martin
HIS ATTORNEY.

Nov. 10, 1931.  J. W. NUNAMAKER  1,831,777
HAND COIL SPRING MAKING TOOL
Filed Aug. 24, 1929  2 Sheets-Sheet 2
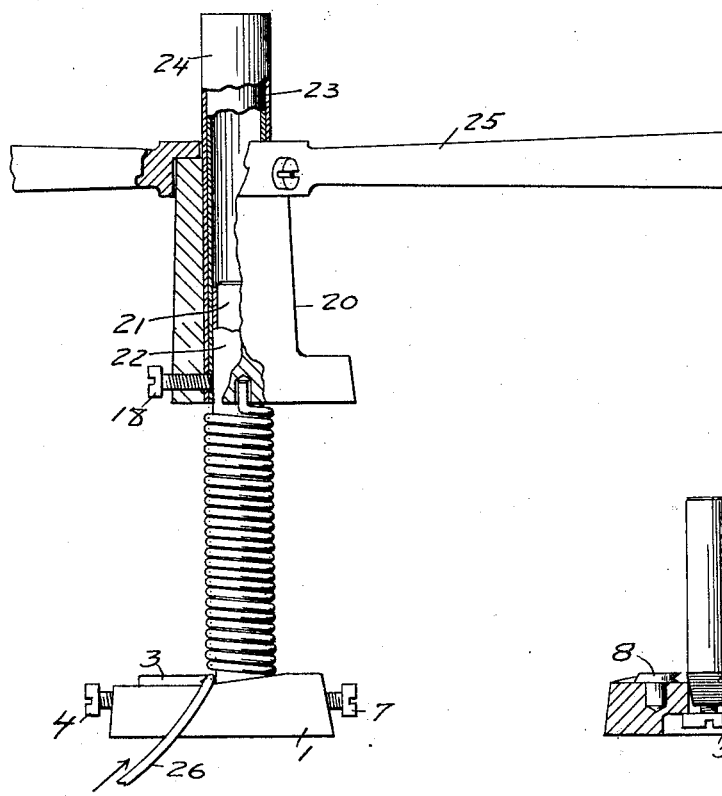
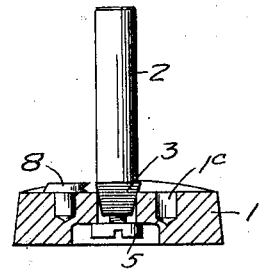
INVENTOR:
John W. Nunamaker,
BY
HIS ATTORNEY.

Patented Nov. 10, 1931

1,831,777

UNITED STATES PATENT OFFICE

JOHN W. NUNAMAKER, OF LOS ANGELES, CALIFORNIA

HAND COIL SPRING MAKING TOOL

Application filed August 24, 1929. Serial No. 388,087.

This invention has relation to means for making springs and refers particularly to a device for winding helical springs.

The object of the present invention is the provision of a simple and inexpensive device capable of producing coil springs of various sizes and with one or a series of coils in each spring. To this end my invention consists in the combinations hereinafter fully described and illustrated in the appended drawings of which:

Fig. 1 illustrates a structure embodying the invention, parts being broken away for the sake of clearness, Fig. 2 is a plan view of the lower portion of the structure, in Fig. 3 portions of the structure of Fig. 1 are reproduced, Fig. 4 is an inverted plan view of the upper portion of the structure, Fig. 5 shows the same, slightly modified, Fig. 6 is an end elevation of the parts illustrated in Fig. 3.

Fig. 7 shows the same from the opposite side,

Fig. 8 is a side elevation of a modified device.

The structure of my invention comprises a base 1, in which is suitably mounted a perpendicularly directed arbor 2. The base is shown depressed in the middle to receive this arbor and to accommodate a slidable gauge 3 which, by means of a screw 4, may be adjusted relative to the arbor, and it is locked in position by a screw 5. The base is shown provided with perforations for mounting on a support.

The numeral 10 designates a movable member, or chuck by means of which the winding is performed, and it is longitudinally perforated to receive the arbor 2. A winding gauge or driver 11 is adjustably mounted on the bottom of the chuck and it is clamped in adjusted position by means of suitable elements 12 and 13. At the top the chuck is shown provided with a square shank to which any suitable handle may be applied for the purpose of facilitating rotations of the chuck.

In order to wind a spring it is only necessary to pass a piece of wire 9 under the gauge 3, substantially as indicated in Fig. 2, in the direction of the arrow, and to lower the chuck until the driver 11 catches the wire, whereupon the chuck is given the required number of turns to produce the length of spring desired. It is to be noted that the gauge and driver may be made exactly alike and that they are provided with grooved faces 3ª, 11ª, under which the wire is firmly held during the winding operation.

The top surface of the base is shown level at the front where the gauge 3 rides on it. From about the middle it is noticed that this surface rises uniformly, reaching the highest point 1ª at the rear end. When the chuck is lowered, the wire is gripped in the groove of the driver, and the turning of the chuck is started, the driver 11 will gradually rise on this incline, which substantially corresponds to the helix angle of the completed spring, and in this manner a perfectly shaped spring may be obtained.

The base is shown made with two perforations 1ᵇ, 1ᶜ, of a size to receive a flat headed plug 8, as indicated in Figs. 2 and 7. When the wire is first inserted, as aforesaid, it may be held in the groove between this plug and the gauge 3, as shown, in order to grip the wire firmly and thereby to obtain the proper tension in the finished spring, and for this purpose the plug is conveniently undercut adjacent to the gauge, as indicated in Fig. 7. Where less tension is wanted, the wire may be drawn straight through, as indicated in broken outline in Fig. 2. The tension of the finished spring may also be varied by adjusting the gauge 3 relative to the arbor.

When the wire is inserted as shown in Fig. 2 the structure is set to wind a right-hand spring. To wind a left-hand spring, the wire is inserted from the opposite side, as indicated by the numeral 26 in Fig. 8. The square shank is, in a device of the size illustrated, proportioned to fit the jaws of an ordinary carpenter's brace. which conveniently may be turned right or left, as required.

By referring to Fig. 7 it is noticed that the gauge 3 is made with downwardly converging sides. The clamping screw 5 draws the gauge tightly into the slot in the base, locking it rigidly in position, so that it cannot turn under the pressure of the wire placed in the gauge.

In case it is desired to form more than one coil on the wire it is only required, after the first coil is finished, to slide it off the arbor and to start a new coil further along the wire. It is readily seen that such additional coils may be made right or left hand, as desired.

The structure of my invention is adapted, within limits, to wind springs of various diameters, and it is necessary to change the arbor and the chuck diameters correspondingly. This I accomplish by means of a series of telescoping sleeves 15, 16, 17. In the drawing only these three sleeves are shown, but more may be used, if desired, in order to produce a greater number of sizes within the same limits. If the arbor is too small, one or more of the sleeves are clamped on the arbor by suitable means, such as a screw 7. The remaining sleeves are held within the chuck perforation by means of a screw 18. In order that these may not drop down, they are made with notches 15$^a$, 16$^a$, 17$^a$, as best shown in Fig. 3, for engagement by the retaining screw 18. The gauges 3 and 11 are then readjusted to suit the diameter of spring to be wound.

Should it be desired to manufacture a number of identical springs it may be found more convenient to insert the end of the wire in one of two perforations 10$^a$, 10$^b$ of the chuck, depending upon whether right or left hand springs are required. The driver 11 is then taken off and the wire is drawn from under th gage 3. Each completed spring is lifted off the arbor, the wire is cut and its end inserted in the proper chuck perforation, and the operation repeated.

For the purpose of making long springs the device may conveniently be modified, as shown in Fig. 8. The base may remain exactly as above described, but a long enough arbor 21 takes the place of the short arbor 2. The sleeves 22, 23, 24 are substantially the same length as the arbor, and they are held in position substantially as described.

Because the perforation of the chuck 20 corresponding to the chuck 10 of Fig. 1 is of the same large size throughout it is not possible to fit the chuck with a square shank for insertion in a carpenter's brace, but any other suitable means, such as a handle 25, may conveniently be employed.

I claim:

1. In a spring winder, a base, an arbor perpendicularly mounted in said base, a chuck perforated to ride on said arbor, and a series of telescoping sleeves between said arbor and the said chuck perforation for adapting the device to wind springs of various diameters.

2. In a spring winder, a base, an arbor perpendicularly mounted in said base, a chuck perforated to ride on said arbor, a series of telescoping sleeves between said arbor and the said chuck perforation for adapting the device to wind springs of various diameters, a gauge on the base for guiding the wire to be wound, and a driver on the chuck for winding said wire.

3. In a spring winder, a base, a detachable arbor perpendicularly seated in said base, a chuck perforated to ride on said arbor, a series of telescoping sleeves between said arbor and the said chuck perforation for adapting the device to wind springs of various diameters, and an adjustable gauge on the base for guiding the wire to be wound, said chuck being equipped to hold the winding end of the wire.

4. In a spring winder, a base, an arbor perpendicularly mounted in said base, a chuck perforated to ride on said arbor, a series of telescoping sleeves between the arbor and said chuck perforation for adapting the device to wind springs of various diameters, an adjustable gauge on the base for guiding the wire to be wound, and a driver adjustable on the chuck for winding the wire, the base rising uniformly from the gauge to its rear end to start the helix of the coil.

In testimony whereof I have hereunto affixed my signature.

JOHN W. NUNAMAKER.